(12) United States Patent
Veres et al.

(10) Patent No.: US 10,193,808 B2
(45) Date of Patent: Jan. 29, 2019

(54) METHOD AND SYSTEM FOR TRIGGERING AUGMENTED DATA COLLECTION ON A NETWORK BASED ON TRAFFIC PATTERNS

(71) Applicant: Exinda Networks Pty, Ltd., Toronto (CA)

(72) Inventors: Greg Veres, Waterloo (CA); Sandra Loop, Waterloo (CA)

(73) Assignee: Exinda Networks PTY Ltd., Austin, TX (US)

( * ) Notice: Subject to any disclaimer, the term of this patent is extended or adjusted under 35 U.S.C. 154(b) by 0 days.

(21) Appl. No.: 15/415,080

(22) Filed: Jan. 25, 2017

(65) Prior Publication Data

US 2017/0134284 A1 May 11, 2017

Related U.S. Application Data

(63) Continuation of application No. 14/680,744, filed on Apr. 7, 2015, now Pat. No. 9,565,109.

(51) Int. Cl.
*H04L 12/801* (2013.01)
*H04L 12/26* (2006.01)
*H04L 12/24* (2006.01)

(52) U.S. Cl.
CPC ............ *H04L 47/12* (2013.01); *H04L 43/062* (2013.01); *H04L 43/0888* (2013.01); *H04L 41/0213* (2013.01)

(58) Field of Classification Search
CPC . H04J 3/14; H04L 43/50; H04L 43/00; H04L 1/00; H04L 45/00; H04L 45/26; H04B 10/0771; H04Q 11/045; H04W 24/00

USPC ....... 370/242, 248, 251, 252, 230, 235, 229, 370/349, 235.1
See application file for complete search history.

(56) References Cited

U.S. PATENT DOCUMENTS

| | | | | |
|---|---|---|---|---|
| 7,889,666 | B1 * | 2/2011 | Pei | H04L 41/065 370/242 |
| 8,565,109 | B1 * | 10/2013 | Poovendran | H04W 4/006 370/231 |
| 8,612,751 | B1 * | 12/2013 | Rayes | H04L 63/0428 340/3.1 |
| 9,319,911 | B2 * | 4/2016 | Gupta | H04W 24/08 |
| 9,565,109 | B2 | 2/2017 | Veres et al. | |

OTHER PUBLICATIONS

Response to Rule 312 Communication dated Dec. 6, 2016, in U.S. Appl. No. 14/680,744, pp. 1-3.

(Continued)

*Primary Examiner* — Brenda H Pham

(57) ABSTRACT

A method and system for increasing the collection of network traffic data in a network based on the occurrence of predetermined criteria. A network appliance manages network traffic in the network and passes data traffic on the network. Network traffic data is collected based on the data traffic passing through the network appliance at a normal level. It is determined whether the network traffic data indicates an abnormal condition. The collection of network traffic data is increased through the network traffic appliance when an abnormal condition is detected. The network traffic data from the increased collection is stored in a memory device.

28 Claims, 6 Drawing Sheets

(56) References Cited

OTHER PUBLICATIONS

Amendment under 37 C.F.R. § 1.312 as filed in U.S. Appl. No. 14/680,744 dated Nov. 18, 2016, pp. 1-5.
Notice of Allowance dated Oct. 24, 2016, mailed in U.S. Appl. No. 14/680,744, pp. 1-28.
Non-Final Office Action dated Oct. 11, 2017, mailed in U.S. Appl. No. 15/415,229, pp. 1-8.
Non-Final Office Action dated Oct. 13, 2017, mailed in U.S. Appl. No. 15/415,312, pp. 1-20.
Response to Non-Final Office Action dated Oct. 11, 2017, as filed in U.S. Appl. No. 15/415,229 on Apr. 11, 2018, pp. 1-10.
Response to Non-Final Office Action dated Oct. 13, 2017, as filed in U.S. Appl. No. 15/415,312 on Apr. 13, 2018, pp. 1-12.
In U.S. Appl. No. 15/415,312, pp. 1-11.
Notice of Allowance dated Nov. 7, 2018, mailed in U.S. Appl. No. 15/415,312, pp. 1-9.
Response to Final Office Action dated Jun. 6, 2018, as filed in U.S. Appl. No. 15/415,229 dated Nov. 6, 2018, pp. 1-9.

\* cited by examiner

METHOD AND SYSTEM FOR TRIGGERING AUGMENTED DATA COLLECTION ON A NETWORK BASED ON TRAFFIC PATTERNS

CLAIM OF PRIORITY

This application is a continuation of application Ser. No. 14/680,744 filed Apr. 7, 2015. The contents of that application are hereby incorporated by reference in their entirety.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present invention relates generally to improving quality of service on a computer network, and, more particularly, to selectively increasing network traffic data collection based on a detected condition.

BACKGROUND

Commonly known local area networks (LAN), such as an Ethernet-based network, communicate data via packets having a set format. Control of packet traffic in a network is critical to insure balanced communication flow and efficient transmission. Such packets are sent between a source network node and a destination node over a communication medium such as coaxial cable or twisted pair wire. Each packet typically has a header that contains limited routing information and a payload.

The most common method of local area network communication is the Ethernet protocol, which is a family of frame-based computer networking technologies for local area networks. The Ethernet protocol is standardized as IEEE 802.3 and defines a number of wiring and signaling standards for the physical layer through means of network access at the Media Access Control (MAC)/Data Link Layer and a common addressing format.

The combination of the twisted pair versions of Ethernet for connecting end systems to the network, along with the fiber optic versions for site backbones, is the most widespread wired LAN technology. Ethernet nodes communicate by sending each other data packets that are individually sent and delivered. Each Ethernet node in a network is assigned a 48-bit MAC address. The MAC address is used both to specify the destination and the source of each data packet in the header. Network interface cards (NICs) or chips on each node normally do not accept packets addressed to other Ethernet nodes.

The speed of computer networks is increasing. Internal LANs with speeds of 1 Gb/s are ubiquitous. Backbones of 10 Gb/s are becoming more and more popular. Some enterprises are moving to 10 Gb/s for their internet gateway, which is already popular at the university institutions.

Network visibility is a desired feature. Network administrators want to know what traffic is on their network and this process takes up networking resources. Also when there are issues in the network, network managers want to investigate by understanding what was happening on the network at the time of the issue and the time leading up to the issue. Additionally when a customer investigates an issue, they typically want highly granular data relating to both network data and non-networking data and richness to the data as well as correlation between the data, so that they can accurately assess the issue.

There are protocols such as NetFlow that output summary information about each network transaction flow as it happens in order to assist network administrators. NetFlow export is a feature that was introduced on Cisco routers that provides the ability to collect IP network traffic as it enters or exits an interface. By analyzing the data provided by NetFlow, a network administrator can determine information such as the source and destination of traffic, class of service, and the causes of congestion. NetFlow records provide detailed visibility into network traffic. However NetFlow records can add 10-15% extra traffic volume on a network. At 1 Gb/s and certainly at 10 Gb/s this represents a large amount of data for a network system to capture and process. Also storing data about the traffic that passes through a network appliance that routes and controls network traffic in a fashion that supports the desired richness represents a large amount of data for a system to capture and process.

Thus, there is a need for a network traffic appliance that varies the type of data monitored on a network based on events in the network. There is also a need for conserving network resources based on the need for additional network traffic data. There is also a need for a network system to collect data from a variety of sources during certain abnormal circumstances.

SUMMARY

According to one example, a method of adjusting network data management in a network appliance coupled to devices in a network is disclosed. The network appliance passes data traffic on the network. Network traffic data is collected based on the data traffic passing through the network appliance at a normal level. It is determined whether the network traffic data indicates an abnormal condition. The collection of network traffic data through the network appliance is increased when an abnormal condition is detected. The network traffic data from the increased collection is stored in a memory device.

Another example is a traffic management system for regulating network traffic between computing devices in a network. The system includes a collection module for collecting network traffic data. A storage device stores network traffic data. The system includes a data analysis module coupled to the data collector module. The data analysis module monitors the network traffic data from the collection module. The collection module increases collection of network traffic data when an abnormal condition is detected by the data analysis module.

Additional aspects of the invention will be apparent to those of ordinary skill in the art in view of the detailed description of various embodiments, which is made with reference to the drawings, a brief description of which is provided below.

Figure 1:
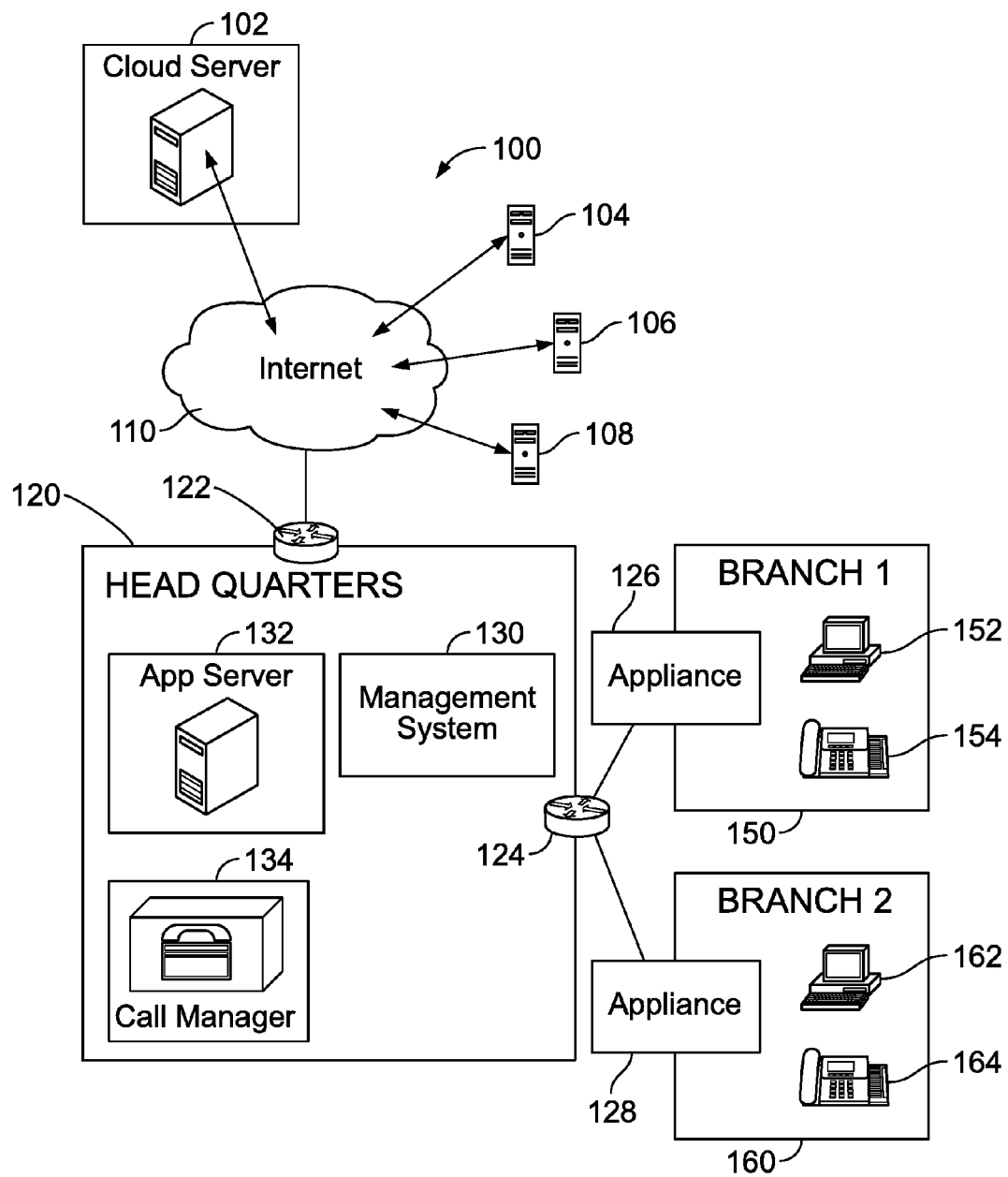
FIG. 1 is a block diagram of an example network system including network traffic management appliances that allows augmented network traffic data collection based on a predetermined condition.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 shows a network system 100 that may include a series of one or more application servers 102, 104, 106, and 108 coupled through a wide area network 110 to a headquarters site 120, which may include a separate local area network. The application servers 102, 104, 106, and 108 may be network nodes of the local area network. The LAN 120 may include devices in the headquarters 120. The local area network may also include other network nodes or devices such as computers. It is to be understood that the servers 102, 104, 106, and 108 may be hardware or software or may represent a system with multiple servers that may include internal networks. In this example, the servers 102, 104, 106, and 108 may be hardware server devices, which run network based applications such as voice over IP (VOIP) services, P2P services, streaming services, database services, file sharing services, instant messaging services, interactive services, mail services, or web services, which are delivered via the wide area network 110. Further, additional servers and workstations and other devices may be coupled to the system 100 or the local area network run by the headquarters 120 and many different types of applications may be available on servers coupled to the system 100. As will be explained below, the local area network may allow network nodes to exchange packets that include trailers having back channel data, such as traffic management data. Each of the network nodes, such as application servers 102, 104, 106, and 108, include a network interface such as a network interface card for establishing a communication channel to another network node.

In this example, the headquarters 120 receives traffic from the network 110 through a router 122. Another router 124 sends traffic to two branch offices 150 and 160 that both may include their own local area network. Traffic is routed to the branches 150 and 160 via a router 124 and managed by network traffic appliances 126 and 128 respectively.

The wide area network 110 may include any publicly accessible network environment, such as the Internet, which includes network components, such as public servers that are not directly managed or under direct control by the network traffic appliances 126 and 128, yet whose operation may still be influenced in unique, novel, and unexpected ways in response to TCP/IP protocol directives strategically purposefully determined and sent from the network traffic appliance 126 and 128 to make the local area networks at the branches 150 and 160, and perhaps the wide area network 110, operate more efficiently, as will be described in greater detail herein. It should be noted, however, that the ensuing descriptions of the various functionalities relating to the servers 102, 104, 106, and 108 are generally applicable to the network devices coupled to the wide area network 110, and thus the remaining description will simply refer to either one as servers 102, 104, 106, and 108 unless noted otherwise. The wide area network 110 is coupled via a network circuit to the router 122, which is used to route network traffic to and from the wide area network 110 through the network traffic appliances 126 and 128 to devices on local area networks at the branches 150 and 160. The local area network at the branches 150 and 160 may include devices such as computers 152 and 162 and also other types of network devices such as VOIP phones 154 and 164.

In this example, the local area networks in the branch offices 150 and 160 may be a local area network environment employing any suitable interface mechanisms and communications technologies including, for example telecommunications in any suitable form (e.g., voice, modem, and the like), Public Switched Telephone Network (PSTNs), Ethernet-based Packet Data Networks (PDNs), combinations thereof, and the like. Moreover, local area networks may be made up of one or more interconnected LANs located in substantially the same geographic location or geographically separated, although the local area networks may include other types of networks arranged in other configurations. Moreover, the local area networks may include one or more additional intermediary and/or network infrastructure devices in communication with each other via one or more wired and/or wireless network links, such as switches, routers, modems, or gateways (not shown), and the like, as well as other types of network devices including network storage devices. The local area networks in the branch offices 150 and 160 are coupled via a LAN switch to the respective traffic management appliance 126 and 128.

The network traffic appliances 126 and 128 may be interposed between the wide area network 110 and the local area networks in the branch offices 150 and 160 as shown in FIG. 1. Communications between the network nodes on the local area networks in FIG. 1 may be conducted via the Ethernet standard in this example. Communications may be made in a data payload in an Ethernet packet sent between a source node and a destination node on the local area network. In this example, the WAN 110 provides users of devices such as the server 132 and computers 152 and 162 with access to servers and systems on the Internet or in other physical locations. The headquarters 120 includes a central management system 130, which in this example may be a Service Delivery Point (SDP) product such as the Exinda Management Centre manufactured by Exinda Networks PTY, Ltd. The central management system 130 in this example allows an administrative user to control the entire networks of the headquarters 120 and the branch offices 150 and 160 from one central console. The central management system 130 allows the administrative user to monitor and configure the treatment of all applications, devices, users, locations, and activities using the network from one management user interface. By placing the network traffic appliances 126 and 128 with quality of service capabilities between the LANs in the branches 150 and 160 and the WAN 110, access to the WAN services may be regulated to ensure that some applications or users have preferential access, thus ensuring efficient use of network resources for critical application use. In this example, the central management system 130 monitors network data traffic across all of local area networks in the branches 150 and 160 as well as the headquarters 120 through information provided by the network traffic appliances 126 and 128. This results in graphs of application and network use across the organization so that the network administrator can determine when problems happen and what to do to fix them. As will be explained below, the central management system 130 may obtain more detailed data from the network traffic appliances 126 and 128 and/or may cause additional data to be collected.

In this example, the application server 132 in the headquarters 120 is a VOIP server that controls a call manger 134. Voice traffic is thus funneled from users of devices such as the VOIP phone 154 in the branch office 150 that goes through the router 124. As will be explained below, the central management system 130 monitors data traffic throughout the networks in FIG. 1. However, if either network traffic appliance 126 or 128 detects flaws such as voice call drops, the respective network traffic appliance may request additional network traffic data from the local area network routers at the direction of the central management system 130. Correction of flaws may be performed either by the network traffic appliance 126 or 128 or by the central management system 130. Alternatively, the data may be stored for troubleshooting analysis by a network manager. The increased data collection may be terminated when the voice call ends or the application server 132 determines an end of transaction, or may continue collecting from transaction.

From the perspective of the network administrator a problem has occurred and the central management system 130 already has a richer set of data for problem resolution purposes. This happens automatically without user interaction, resulting in a rich set of data being available for the time period surrounding the problem incident. By having the system automatically adjust its data collection, expensive data hasn't been collected during periods when it is not needed.

Figure 2:
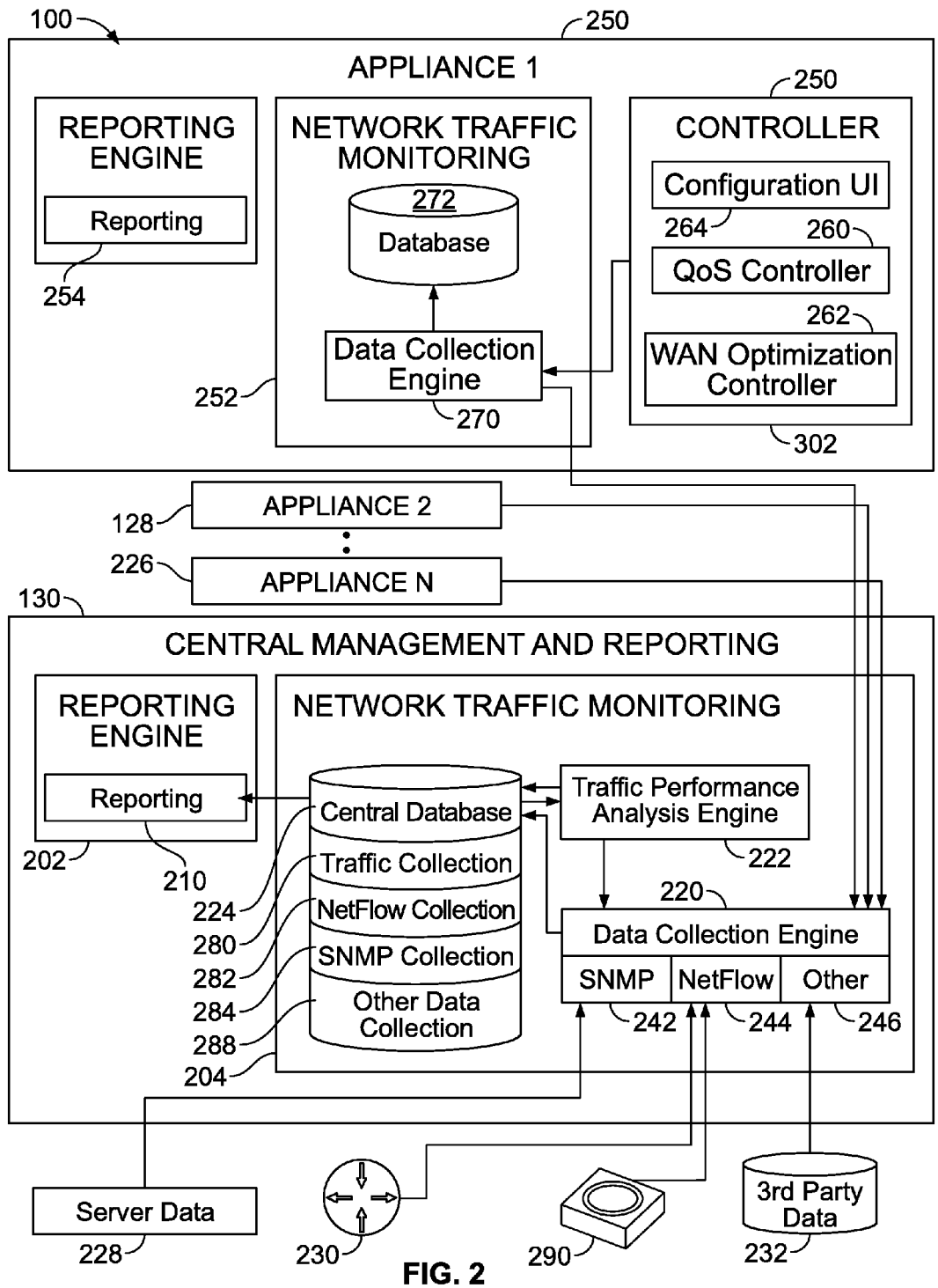
FIG. 2 is a block diagram of a central management system in FIG. 1 that determines when to initiate augmented data collection via network traffic appliances.

FIG. 2 is a detailed block diagram of the central management system 130 and a number of traffic management appliances such as the network traffic appliances 126 and 128. As explained above, the central management system 130 may collect network traffic data from the network traffic appliances 126 and 128 or other devices in the networks. The central management system 130 includes a reporting module 202 and a network traffic monitoring module 204. As will be explained below, the network traffic monitoring module 204 adjusts the amount of collected network traffic data from different devices such as network traffic appliances or other network devices according to need. The reporting module 202 includes a reporting engine 210 that interfaces with the network traffic monitoring module 204 to report the results of data on the flow of traffic in one or more networks monitored by the central management system 130.

The network traffic monitoring module 204 includes a data collection engine 220, a traffic performance analysis engine 222, and a traffic collection database 224. The data collection engine 220 may obtain normal data from various sources including network traffic appliances such as the network traffic appliances 126 and 128 and other network traffic appliances such as a network traffic appliance 226. Increased data may be obtained from these sources as will be explained below. Other sources for increased data collection may include servers 228, Netflow data from a router 230, and a third-party data source 232. Each server 228 may include network traffic data or data related to server operation such as SNMP data in this example. As explained above, Netflow is a data protocol that may include summary information about each network transaction flow. Third-party data 232 may be in the form of data in a proprietary format that relates to network traffic generated from software or devices from third parties to assist in network traffic monitoring and analysis. The data collection engine 220 also includes data interfaces to collect data from different sources. In this example, the data collection engine 220 includes an SNMP data interface 242, a Netflow interface 244, and a third-party interface 246. The data interfaces are each connected to different sources of data.

As explained above, the central management system 130 is coupled to the network traffic appliances such as the network traffic appliances 126 and 128, which may collect traffic data on a smaller network managed by the respective network traffic appliance. In this example, the network traffic management appliance 126 may be one of the series 4761 Network Orchestrator traffic management appliances available from Exinda Networks PTY, Ltd. of Australia. The network traffic appliance 126 may provide a connection to the wide area network 110 via the router 124 and manage traffic to and from the wide area network 110 to a local area network in the branch office 150 and the devices therein such as the computer 152 and the VOIP phone 154. Optimizing the WAN connections to the LAN allows network administrators to route inbound and outbound traffic on the network circuit coupled to the wide area network 110 based on a variety of factors. Traffic may be prioritized and de-prioritized by application type, who is generating the traffic, and the time of day the request is being made. For example, traffic flowing between the branch office 150 and the head office network can be prioritized over any other traffic. The network traffic appliance 126 provides all of the core capabilities needed to effectively manage a network circuit from the WAN 110. These tightly integrated capabilities include real-time monitoring, reporting, traffic control, optimization, and intelligent acceleration.

In this example, the network traffic appliance 126 may include a controller 250, a network traffic monitoring module 252 and a reporting engine 254. The controller 250 includes a quality of service (QoS) controller 260, a WAN optimizer controller 262, and a configuration user interface 264. The WAN optimizer controller 262 monitors applications running on the network managed by the network traffic appliance 126. The configuration user interface 264 displays network traffic data to a user and allows the user to configure policies to direct network traffic managed by the network traffic management appliance 126.

The QoS controller 260 includes an enforcement module that accesses stored rules or policies for managing network traffic managed by the network traffic appliance 126 such as traffic on the LAN at the branch office 150.

In FIG. 1, users on a LAN, such as those of the branch office 150, have all of their traffic from the WAN 110 flow through the network traffic appliance 126, which applies its QoS rules and policies from the QoS enforcement module. A client computer on the LAN, such as the computer 152, will make a request to a website that may be operated by the server 102 coupled to the WAN 110. For example, a user may log on to a website. This request competes with all the other WAN bound requests and responses. The QoS enforcement module in the network traffic appliance 126 shapes the network traffic allocated to the user requests such as that for web access according to the rules (policies) that the administrator has configured. This allows certain traffic to be guaranteed certain portions of the link and other traffic to be limited to certain portions.

Network traffic data collection is accomplished by the network traffic appliances 126 and 128 in the course of managing traffic on their respective networks. The network traffic monitoring module 250 includes a data collection engine 270, which stores collected network traffic data to a database 272. The data collection engine 270 also is connected to the data collection engine 220 of the central management system 130. As will be explained below, the network traffic data collected by the data collection engine 270 may be requested by the data collection engine 220 when certain conditions exist. The LAN in each of the branch offices 150 and 160 are monitored by the network traffic appliances 126 and 128 respectively. The data collection engine 270 collects certain network data; calculates an application performance score from performance as observed by the user; monitors network delay, server delay, and loss/jitter; and establishes a baseline of what each value should be. The network traffic appliances 126 and 128 collect a baseline of network traffic data that is stored for historical purposes in the database 272.

The speed of the local area networks in the branches 150 and 160 allows a large amount of network traffic data to be collected by the network traffic appliances 126 and 128, which could potentially tie up system resources. However, the reality is that most of the network traffic data that is collected will not be used during the analysis phase by either the network traffic appliances 126 or 128 or the central management system 130. Thus, the present process of selected increased data collection after a limited period of time ensures that the central management system 130 has collected the network traffic data that is necessary for the analysis phase while minimizing the total data being collected.

The described process captures the network traffic data that is necessary to diagnose a networking problem during an increased data collection period, while not requiring an expensive system in terms of developer effort, deployed hardware cost, and the network bandwidth requirements. Thus, one advantage of the system 100 is the ability to use more cost-effective hardware and less overall memory for network devices. For example, the database 224 includes normal traffic data 280, Netflow collection data 282, SNMP data 284, and third-party data 286. Since data from other sources is only collected during a certain time, the storage necessary for additional collected data 282, 284, and 286 is reduced in comparison to storage required if such data is continually collected.

One example of an application for increased data collection is a Netflow collector application. Netflow is a standard data format for network devices that is emitted for each flow that goes through the device. The network traffic appliances 126 and 128 will request that Netflow records are sent when an abnormal event occurs, such as when monitored application performance drops. The Netflow records will include requested information such as how many bytes and type of application for network data traffic. There is a huge amount of data and very granular data in a Netflow request. Thus, continuous usage of a Netflow collector application is difficult due to the bandwidth required to collect the necessary data. However, the use of a Netflow collector on request allows use of the Netflow collector when it is needed, thus saving network resources.

The central management system 130 controls the amount of network traffic data collection based on a specific situation. The central management system 130 may collect network traffic data from a number of different network devices. In normal operation, the central management system 130 collects network summary data from the data collection engines of the network traffic appliances 126 and 128. The central management system 130 thus monitors the network traffic at a base level in normal operation. When characteristics of the network traffic are detected that indicate an issue in the network may be occurring, a heighted data collection protocol automatically turns on and starts increasing the data collection by the central management system 130. Thus, when an administrative user is notified by the central management system 130 that there is an issue with the network, detailed data may be made available in order to investigate the issue. If the augmented data collection is turned on when the notification threshold is reached, then the increased data that is captured represents the network data slightly after the problem first starts to manifest. To alleviate this problem a simple scaling factor may be applied to the notification threshold that indicates a network problem as will be explained below.

If the predicted issue does not occur or if the administrative user does not investigate within a fixed period of time, the central management system 130 can remove the extra data 282, 284, and 286 from the database 224 to ensure that the required storage space for data collection is limited.

It is also important that there are more false positives than false negatives in terms of identifying potential issues. For issues that are hard to predict, the central management system 130 may always collect and store augmented data relating to the issue. If the extra data is not required, either because no issues arose or the network administrator does not need to investigate the issue, the central management system 130 can automatically remove the extra data based on the time the data has been stored and unused or other factors such as the capacity of the data storage device.

In operation, network traffic data in the central office 120 is collected as traffic is processed by the network traffic monitoring module 206 of the central management system 130. The collected network traffic data is summarized and stored in the central database 224. The traffic performance analysis engine 222 reads the data from the database 224 and analyzes the data. For example, an application performance analysis engine may look at a number of metrics for a given server application available over a network such as network delay, server delay, jitter, loss, round trip time) to determine whether the application is performing well. The traffic performance analysis engine 222 stores the data 280 in the database 224. The reporting engine 210 generates reports on the data from the database 224.

If the traffic performance analysis engine 222 determines that there might be a problem (e.g., the application performance score dropped indicating that the end user experience of the application was poor), then it notifies the data collection engine 220. The data collection engine 220 may then enter an augmented data collection mode where it gathers data from other sources in addition to base line data. The data collection engine 220 stores the augmented data from the other sources in the database 224. The data collection engine 220 may also change what data is received and the summarized granularity of the data from the sources. The reporting engine 210 can report on the data from the standard (non-problem) state, as well as the extra data that was generated due to the problem state.

When the traffic performance analysis engine 222 determines that there is no longer a problem, it notifies the data collection engine 220 to stop collecting extra data. If the analysis engine 222 determines that the event that triggered the extra data collection was not actually a problem, it can remove the extra data that was collected from the database 224 in order to conserve storage capacity.

There may be any number of use cases of issues that may cause augmented data collection. In one example in the system 100 in FIG. 1, if one of the network traffic appliances 126 or 128 notices a bad call occurring from the VOIP phones 154 or 164, the appropriate network traffic appliance 126 or 128 may commence collecting more data about the call as well as inform the management system 130 that a bad call is occurring. The management system 130 may then start collecting data through SNMP data from the call manager 134 as well as data from the data collectors of the network traffic appliances 126 and 128. When VoIP calls are detected as being poor, the central management system 130 may collect more information regarding the VoIP calls (such as collecting and storing data for all fair to poor calls, storing conversation metadata for the calls, storing more data for non-VoIP operations) so that the network manager knows who participated in the poor calls, what the bandwidth utilization was, what the metrics of the call quality were, what other traffic was on the network at the time of the poor calls.

Another example is when excessive network traffic data falls into an auto-catch-all bucket of a network traffic appliance such as the network traffic appliance 126. The QoS controller 260 of the network traffic appliance 126 has configured policy rules for all the network traffic that passes through the network traffic appliance 126. These policy rules are configured by the network administrator. If there is network traffic that does not match any of the rules, the network traffic appliance 126 puts the non-matching network traffic into an automatically created auto-catch-all rule. Thus, when excessive data falls into the catch-all bucket, the system was not configured properly, and the policy rules are not processing some of the network traffic, the central management system 130, may collect more information (such as full conversation data), so that the administrative user can determine how to better configure the system.

Another example is when there is a spike in traffic throughput overall or by a single user/IP or group as evidenced by an unusually high amount of network traffic for the user/IP or group for a period of time. The central management system 130 may collect more network traffic information (such as conversation data), so that the administrative user may determine if the spike in traffic is acceptable. For instance, if the traffic spike was due to conversations with social networking sites, or P2P sites, it may not be acceptable and the administrative user may implement a policy to limit this type of behavior.

In another example, when there is an issue in the network, the central management system 130 may collect NetFlow data from network appliances other than the network appliances 126 and 128. This provides insight into other network components. For example, the system may collect NetFlow data from a router that will provide insight into network traffic flowing in other parts of the network.

In another example, when P2P traffic is detected by deep packet inspection by one of the network traffic appliances 126 or 128, the central management system 130 may collect more information (such as more granular data and conversation data), so that the network manager can gather all the data required to deal with a copyright violation investigation.

In another example, when server health issues are detected for a particular host such as the server 132, the central management system 130 may collect more data such as SNMP data from the server.

In another example, when a server has a lengthened response time to requests, the central management system 130 may start to poll server health statistics through SNMP and, upon further diagnosis, may determine that the system is under attack from a DDoS attack and turn on extra data collection from a firewall to collect data that may help the administrator track down the source of attack.

When the number of connections spike, the central management system 130 may collect more information regarding the connections (such as conversation data) so that it can be determined why there were so many connections. For instance, a spike in connections may indicate a denial of service attack.

The central management system 130 may have particular traffic patterns that are stored based on previous operation. When the current traffic patterns of the networks deviate from the expected traffic pattern, the central management system 130 may collect more information (such as more granular data and conversation data), so that issues that arise with the traffic deviation symptom can be investigated.

When an application that has been identified as an important application, for example, if there is an application performance score object created to monitor it and the application starts performing poorly as evidenced by the calculated score dropping below a threshold level, the central management system 130 may collect more data regarding the other traffic in the network at the time so that the network manager can properly investigate how to better protect that application.

A specialized application may be the Netflow producer module 290 connected to the central management system 130 in FIG. 2. The Netflow producer module 290 includes a traffic monitor and a Netflow emitter.

In one example, the network traffic appliances 126 and 128 monitor traffic and computing application performance scores of devices on the LANs of the branches 150 and 160. In this example, when the application performance score drops below a threshold value, the network traffic appliances 126 and 128 report the occurrence to the management system 130. The management system 130 then decides if more network traffic data is needed to analyze the occurrence. If more network traffic data is needed, the central management system 130 may command the network traffic appliances 126 and 128 to start collecting more network traffic data such as data in the form of Netflow data collection or other types of data collection. The central management 130 may also communicate to an application server such as the application server 132 and starts collecting SNMP data about the health of the application server hardware and software. This may also happen for cloud-hosted application servers such as the server 102 in FIG. 1. However, since SNMP data may not be available from the cloud hosting server, the management system 130 may turn on Netflow collection from the Netflow producer module 290 so that all conversations competing for the limited bandwidth of the Internet connection will be collected for future analysis.

In this example, the traffic monitor on the Netflow producer module 290 monitors traffic of a specific application. Based on this traffic, the system will compute a score for the application. The application score is computed from a number of factors including network traffic variables such as network delay, loss, and jitter as well as server response factors such as server delay. These are combined into an Application Performance Score (APS). The NetFlow emitter on the Netflow producer module 290 monitors traffic flowing through it and produces a NetFlow v9 record for each flow on the network. This flow emission can be controlled through a configuration setting of the appliance.

The Netflow v9 records are sent to the Netflow interface 244, which acts as a NetFlow collector that collects the NetFlow v9 records. The Netflow interface 244 stores the records and allows the user to see reports based on the data within the NetFlow records. The traffic performance analysis engine 222 monitors the APS scores generated by the traffic monitor and may control the configuration settings of the NetFlow Emitter of the interface 244 in the data collection engine 220.

The central management system 130 will monitor the application performance scores (APS) produced by the appliance such as the network traffic appliance 126. When the APS drops below a threshold value, the central management system 130 will communicate with the Netflow producer module 290 to instruct it to start emitting the NetFlow v9 records. The threshold value is provided by the customer or automatically computed by the network traffic appliance through a base-lining process. These records are sent to the central management system 130 for collection and later reporting. The central management system 130 continues to monitor the APS; when it returns to a value above the customer specified value, the central management system 130 instructs the Netflow producer module 290 to stop emitting NetFlow records.

Alternatively, a network traffic appliance such as the network traffic appliance 126 may assume the functions of a traffic monitor and Netflow emitter performed by the Netflow producer module 290. In this instance, the network traffic appliance 126 may be configured for certain conditions to start emitting NetFlow records. This logically extends to multiple appliances such as the other network traffic appliances emitting NetFlow records to the single central management system 130. By having the NetFlow emission turned on and off in this manner, the entire volume of traffic for monitoring can be increased without the NetFlow collection becoming the bottleneck of the monitoring system. Using this solution, the NetFlow collector only has to handle a fraction of the traffic volume for a fraction of the total time compared to traditional "always on" NetFlow collection procedure. Therefore, the NetFlow collector (either producer module 290 or network traffic appliance 126) in this example is allowed to fall behind in the collection because it would be given a chance to catch up when collection is no longer required, such as when the APS indicated that there was no longer an application performance issue.

To ensure that the data is collected before the issue is confirmed, a simple scaling factor may be applied to the threshold value that indicates a network problem. For example, one threshold value may be a simple percentage factor of 10%. The data collection could be enabled when the application performance scores (APS) are within 10% of the configured threshold value. This would enable data collection slightly ahead of the APS value triggering an alert to the customer. The data collection could be turned off at the same 10% threshold value as the APS is rising. The use of a scaled value allows collecting more data but it would still retain the majority of the benefit while providing data before the threshold was crossed. The exact value before the threshold would be dependent on the nature of how the APS is computed.

The advantages of selected augmentation of data collection make the system more efficient to operate. Due to the periodic increase in data collection, a single platform may scale to higher levels of traffic monitoring without having to increase its overall capacity.

A network manager can specify how sensitive the detection should be and make the appropriate settings in the traffic performance analysis engine 222 of the central management system 130. For example, increasing the sensitivity or increasing the threshold percentage will result in greater instances of increased data collection while decreasing sensitivity or decreasing the threshold percentage will result in less instances of increased data collection. A network manager can specify that detection is to be processed when particular subnets such as a subnet representing a particular server or set of devices are involved. In this manner, extra data collection may be isolated for a particular application for a particular set of servers. A network manager may also specify how aggressively the collected data is cleaned up. For example, the collected data from the augmented network traffic data may be stored for 14 days in the central database 224, or may be immediately erased once an abnormal condition triggering the increased collection is remedied.

When the central management system 130 instructs a network traffic appliance such as the network traffic appliance 126 to start augmenting data collection, the central management system 130 could apply a filter such that only the network traffic records that are contributing to the network issue are collected and stored. For example, only a certain type of data collection may be enabled for the data collection engine 220 such as SNMP data. This further reduces the amount of data that is stored during the augmented data collection periods.

Even though SNMP data from a server is not expensive to retrieve relative to other forms of data, SNMP data would also be wasted if collected all of the time. The additional monitoring data from the data server may be controlled by the same application performance score mechanism. When the APS drops below a threshold, the traffic collection of SNMP may be enabled. When the APS rises above a threshold, the traffic collection of SNMP may be suspended again.

There are other systems available that collect more in-depth server performance metrics based on Application Performance Monitoring agents. These agents put an extra load on the server that they are monitoring. These agents could also be controlled via thresholds of the application performance score. When the score falls below a threshold, the data collection is enabled via the agent. When the score rises above a threshold, the data collection may be suspended for the agent.

Figure 3:
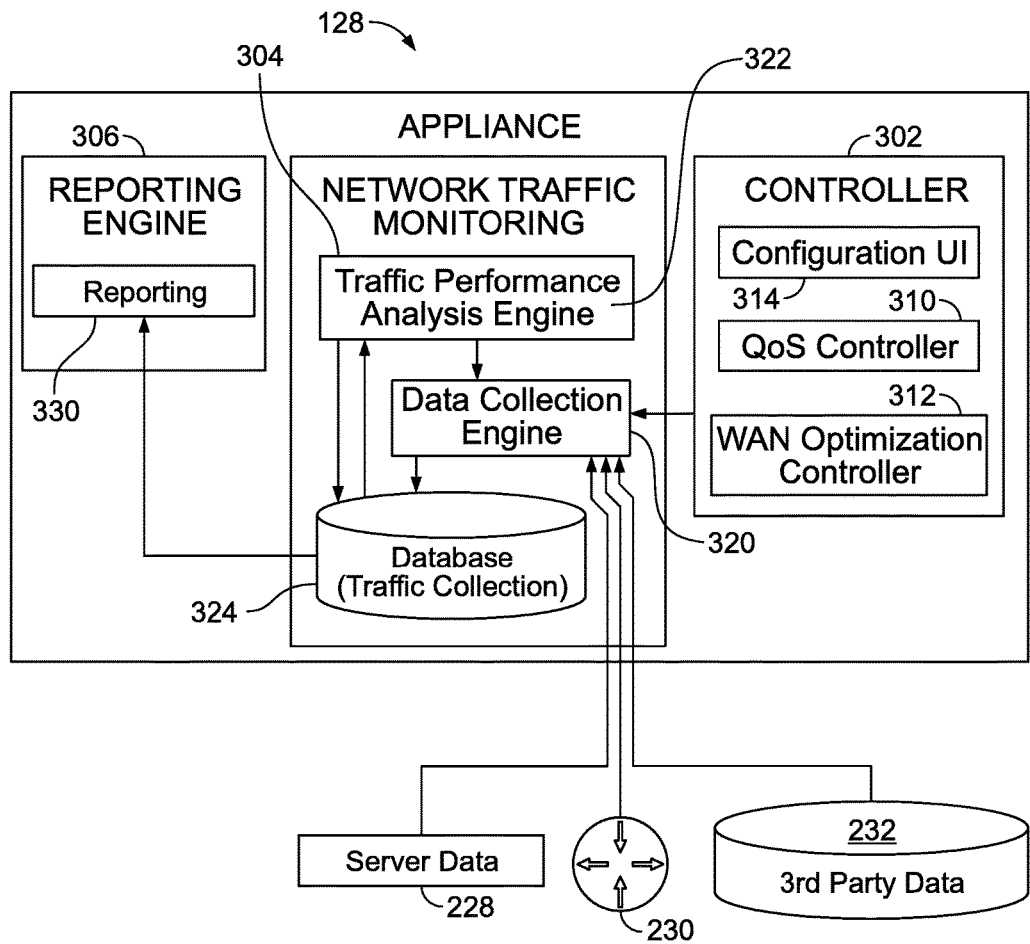
FIG. 3 is a block diagram of a traffic management appliance in FIG. 1 that may initiate augmented collection of traffic data in a network.

The augmented network collection may also be run for a single network via a network traffic appliance such as the network traffic appliance 128 in FIG. 1. FIG. 3 shows a block diagram of the network traffic appliance 128 that may increase augmented data collection for a LAN such as the LAN on the branch office 160 independently from the central management system 130. Of course, the network traffic appliance 128 may also work under the direction of the central management system 130 as described above in relation to data collection from the network traffic appliance 128 for overall network traffic data.

The network traffic appliance 128 shown in FIG. 3 includes a controller 302, a network traffic monitoring module 304, and a reporting module 306. The controller 302 includes a quality of service (QoS) controller 310, a WAN optimizer controller 312, and a configuration user interface 314. The WAN optimizer controller 312 monitors applications running on the network. The configuration user interface 314 displays network traffic data to a user and allows the user to configure policies to direct network traffic managed by the network traffic management appliance 128.

The QoS controller 310 includes an enforcement module that accesses stored rules or policies for managing network traffic managed through the network traffic management appliance 128.

The network traffic monitoring module 304 includes a data collection engine 320, a traffic performance analysis engine 322 and a traffic collection database 324. The data collection engine 320 obtains data from the network traffic controlled by the network traffic appliance 128. Other sources of network traffic data may include the servers 228, the Netflow collector 230, and third-party data 232 as explained above in reference to FIG. 2.

The reporting module 306 includes a reporting engine 330, which interfaces with the network traffic monitoring module 304 to report the results of data on the flow of traffic in the network monitored by the network traffic appliance 128.

In FIG. 1, users on a LAN, such as those of the branch office 160, have all of their traffic flow through the traffic management appliance 128, which applies its QoS rules and policies from the QoS enforcement module. A client computer on the LAN, such as the computer 162, will make a request to a website that may be operated by the server 102 coupled to the WAN 110. For example, a user may log on to a website. This request has to compete with all the other WAN bound requests and responses. The QoS enforcement module in the traffic management appliance 128 shapes the network traffic allocated to the user requests such as that for web access according to the rules (policies) that the user has configured. This allows certain traffic to be guaranteed certain portions of the link and other traffic to be limited to certain portions.

Network traffic data collection is accomplished by the data collection engine 320 that stores collected data to the database 324. As will be explained below, the network traffic data collected by the data collection engine 320 may be requested by the reporting engine 330 when certain conditions exist. The data collection engine 320 in this example collects certain network data from the LAN, calculates the application performance score of applications such as VOIP, performance as observed by the user, monitor network delay, server delay, loss/jitter, and establish a baseline of what each value should be. The network traffic appliance 128 collects a baseline of network traffic data that is stored for historical purposes in the database 324.

Figure 4A:
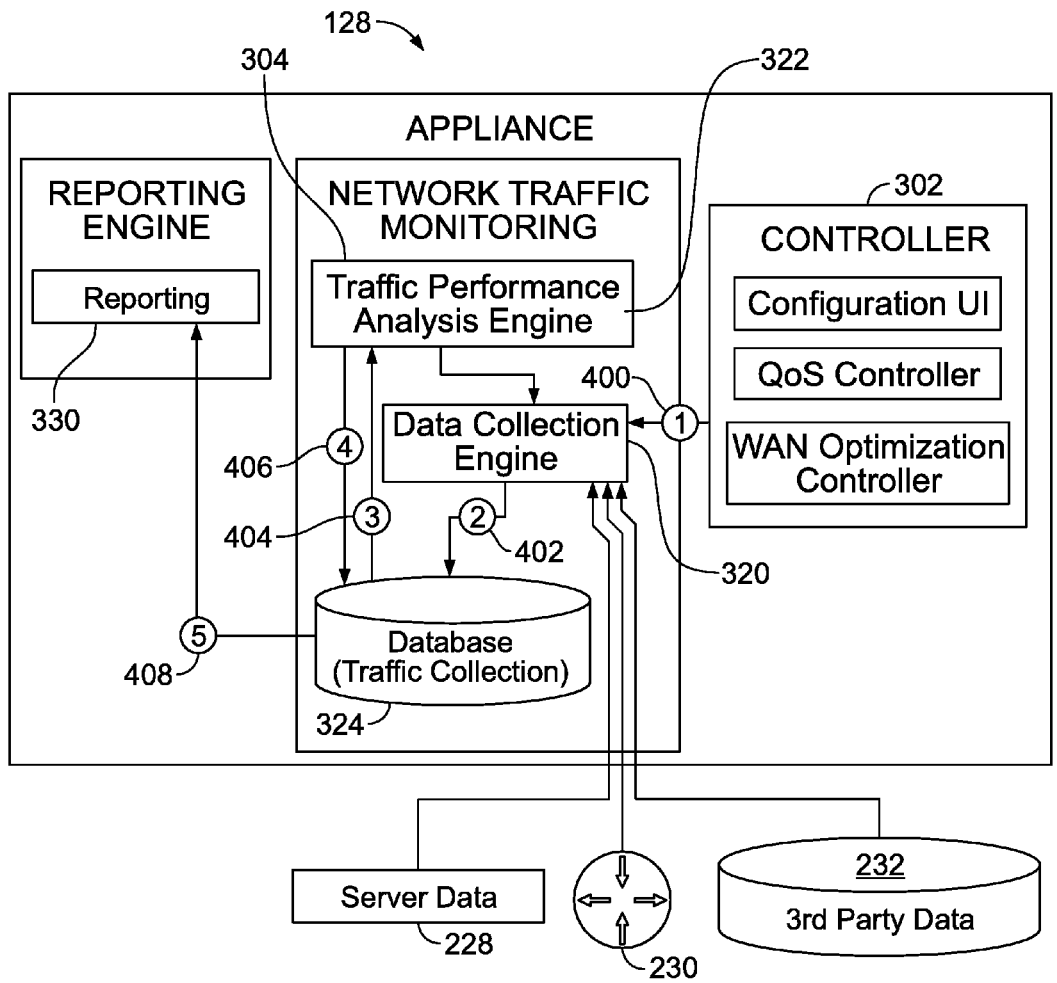
FIG. 4A is a flow diagram showing the operation of the collection of data by the traffic management appliance in FIG. 3 under normal circumstances.

FIG. 4A shows the components of FIG. 1 under normal data collection circumstances by a network traffic appliance such as the network traffic appliance 128 in FIG. 3. Like element numbers are labeled in FIG. 4A as in FIG. 3. The controller 302 transmits normal network traffic data to the data collection engine 320 (400). The controller 302 collects normal data relating to network traffic on the LAN in the branch office 160 in this example such as VOIP application performance score, network delay, server delay, and loss/jitter. The collected normal network traffic data is stored in the traffic collection database 324 (402). The traffic performance analysis engine 322 periodically reads the data to determine if an abnormal condition is present (404). The traffic performance analysis engine 322 stores the status of the network based on the analysis of the normal data in the database 324 (406). The reporting engine 330 takes data from the database 324 to prepare reports on the status of network based on the normal network traffic data collection (408).

Figure 4B:
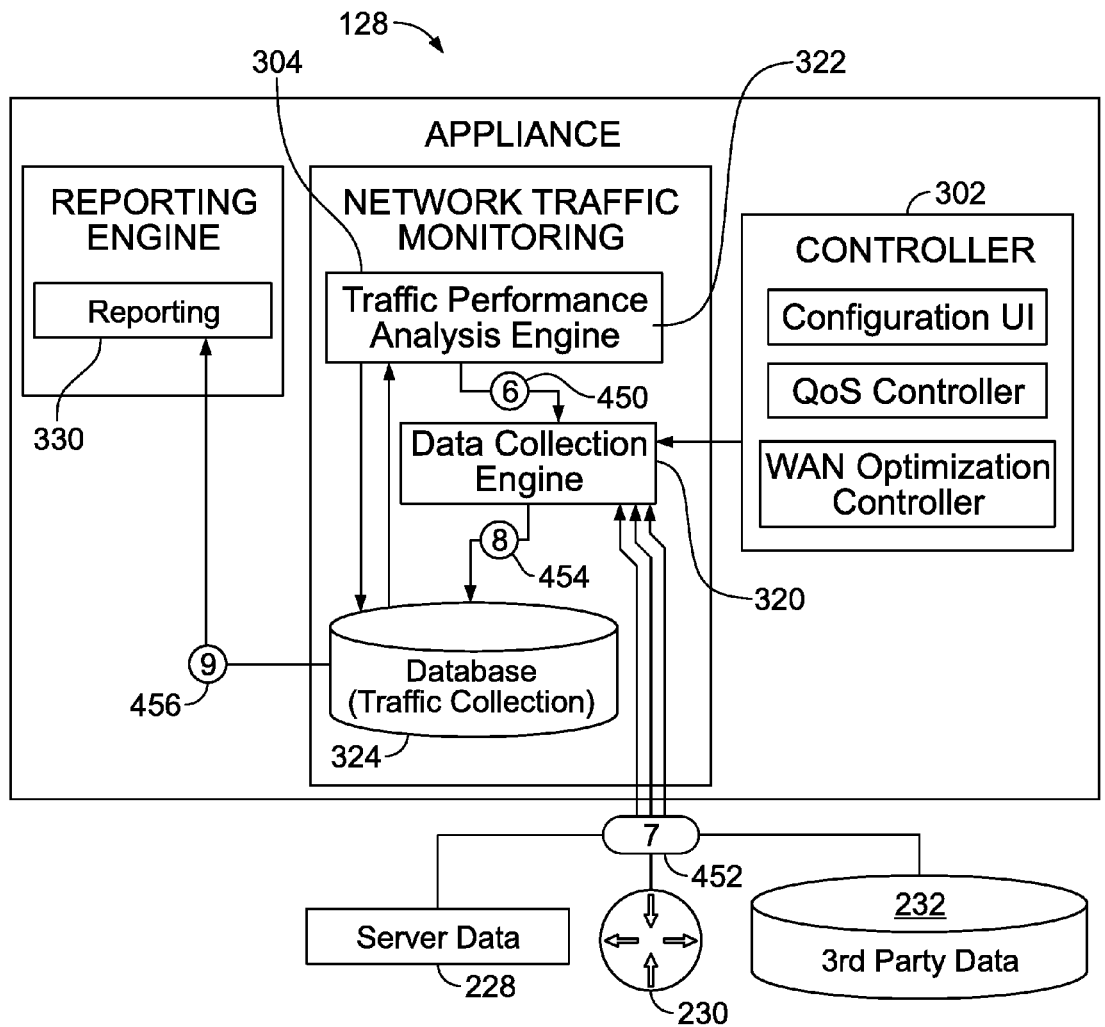
FIG. 4B is a flow diagram showing the operation of the augmented data collection by the traffic management appliance in FIG. 3.

FIG. 4B shows the components of FIG. 1 and FIG. 3 when an abnormal condition is detected and increased network data collection occurs in the system in FIG. 1. Normal network traffic data is analyzed by the traffic performance analysis engine 322 as explained above in FIG. 4A. When the traffic performance analysis engine 322 determines an abnormal condition such as when the application performance score drops, the increased data collection is triggered. The traffic performance analysis engine 322 commands the data collection engine 320 to increase collection of data (450). The data collection engine 320 increases the collection of network traffic data (452). The increased collection of data may include additional data from the network traffic appliance controller 302. The increased collection of data may also include SNMP data from the servers 228, Netflow protocol data from the router 230 or the Netflow producer module 290, and third-party collected data from the third-party data source 232 in FIG. 2.

The data collection engine 320 sends the data from the increased collection of network traffic data to the network traffic data database 324 for storage (454). The increased collection of data results in more data being stored than the normal data collected. The reporting engine 330 reads the data from the database 324 for further analysis to determine the abnormal condition (456).

When the analysis engine 322 determines that the event that triggered the increased data collection is no longer a problem, it commands the data collection engine 320 to cease the increased data collection. The network traffic appliance 128 then returns to normal operation of data collection. The traffic analysis engine 322 may determine that the event that triggered the increased data collection was not actually a problem and may remove the collected data from the database 324.

Figure 5:
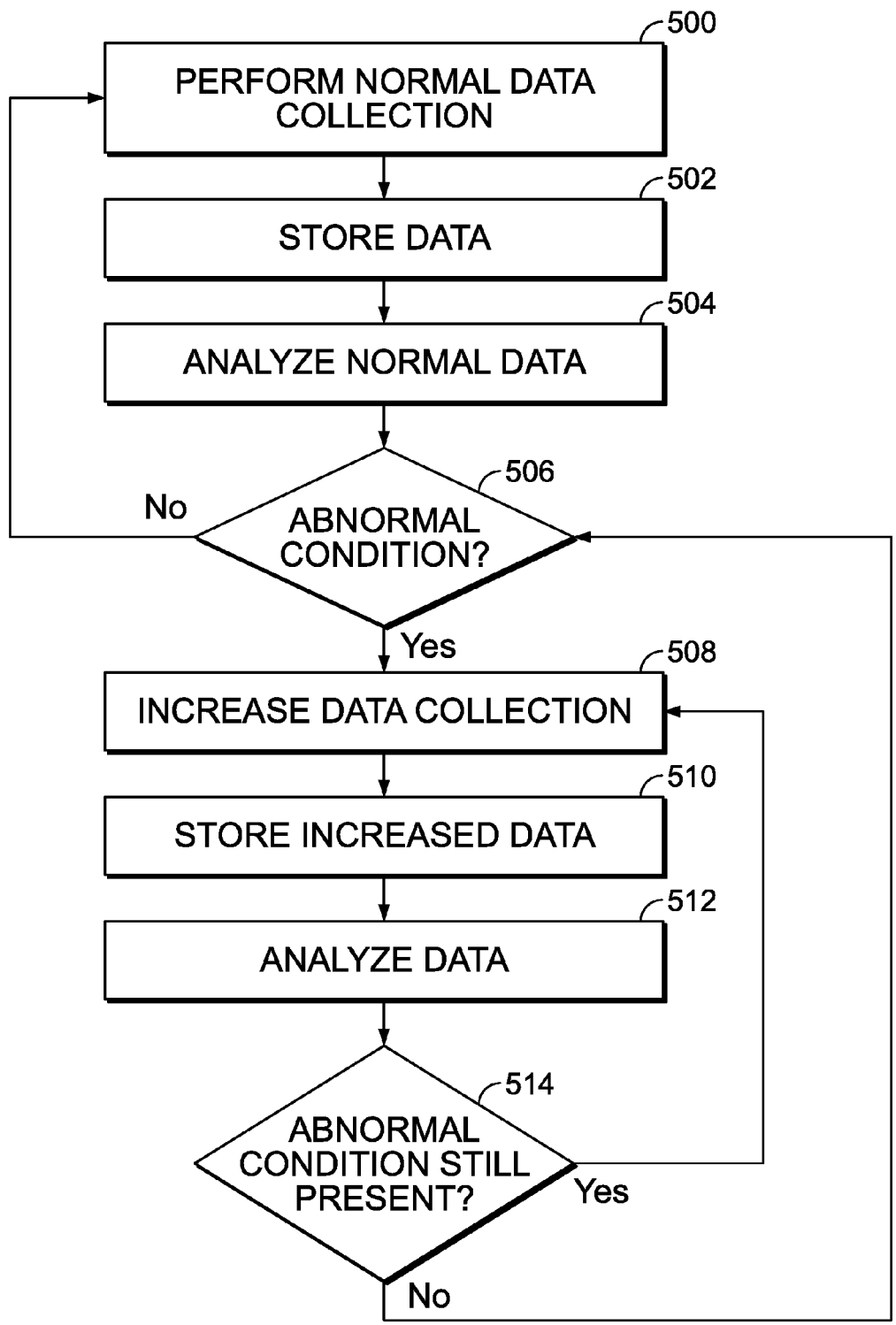
FIG. 5 is a flow diagram of the process of triggering the augmented data collection by the network system in FIG. 1.

The process of adjusting network traffic policies will now be described with reference to FIGS. 1-3 in conjunction with the flow diagram shown in FIG. 5. The flow diagram in FIG. 5 is representative of example machine readable instructions for enhanced network traffic data collection for the system in FIG. 1. In this example, the machine readable instructions comprise an algorithm for execution by: (a) a processor, (b) a controller, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces could be implemented by software, hardware, and/or firmware. Also, some or all of the machine readable instructions represented by the flowchart of FIG. 5 may be implemented manually. Further, although the example algorithm is described with reference to the flowcharts illustrated in FIG. 5, persons of ordinary skill in the art will readily appreciate that many other methods of implementing the example machine readable instructions may alternatively be used. For example, the order of execution of the blocks may be changed, and/or some of the blocks described may be changed, eliminated, or combined.

FIG. 5 is a flow diagram of the process followed for enhanced data collection by the central management system 130 in FIG. 1. Normal network traffic data collection is performed by the data collection engine 220 (500). The collected normal data is stored in the central database 224 (502). The stored data is analyzed by the traffic performance analysis engine 222 (504). The analysis may occur periodically or in real time. The traffic performance analysis engine 222 determines whether an abnormal condition exists. If an abnormal condition does not exist, the system continues to collect data normally (500).

If an abnormal condition is detected, the traffic performance analysis engine 222 causes the data collection engine to increase the collection of network traffic data (506). The increased collection can come from the network traffic appliances 126 and 128 managed by the central management system 130 as well other sources such as servers 228, the router 230, the Netflow producer module 230, and third-party data 232. The data from the increased collection is stored in the database 224 (510). The analysis engine 222 analyzes the additional data (512). The additional data may also be sent to the reporting engine 210 for later analysis. The analysis engine 222 determines whether the abnormal condition is still present (514). If the analysis engine 222 determines the abnormal condition is still present, the increase in data collection is continued (508). If the analysis engine 222 determines the abnormal condition has ceased, the analysis engine 222 will cause the data collection engine 220 to resume normal collection of data (500).

Each of these embodiments and obvious variations thereof is contemplated as falling within the spirit and scope of the claimed invention, which is set forth in the following claims.

What is claimed is:

1. A method of adjusting network data management in a network appliance coupled to devices in a network, the network appliance passing data traffic on the network, the method comprising:
   collecting network traffic data from a first set of data sources based on the data traffic passing through the network appliance at a normal level;
   determining whether the network traffic data indicates an abnormal condition;
   when an abnormal condition is determined, collecting network data from a second set of data sources and increasing the collection of network traffic data through collection of network data from a second set of data sources and through the network traffic appliance, wherein the first set of data sources is different than the second set of data sources; and
   storing the network traffic data from increased collection in a memory device.

2. The method of claim 1, further comprising monitoring the increased collection of network traffic data to determine the cessation of the abnormal condition.

3. The method of claim 2, further comprising returning the collection of network traffic data to the normal level when the abnormal condition has ceased.

4. The method of claim 2, further comprising returning the collection of network traffic data to the normal level after a predetermined time.

5. The method of claim 1, wherein the network traffic data from the increased collection is removed from the memory device after the abnormal condition ceases.

6. The method of claim 1, wherein the increased data collection includes network traffic data collected under the Netflow protocol.

7. The method of claim 1, wherein the increased data collection includes at least one of network traffic data from a router, a server a firewall, or a network device.

8. The method of claim 1, wherein the central management device controls a second network traffic appliance monitoring traffic on a second network, the increased data collection coming exclusively from the first network traffic appliance.

9. The method of claim 1, wherein the increased collection of network traffic data is performed through a data collection device in the network.

10. The method of claim 9, wherein the data collection device executes an application from a third party separate from a vendor of the network traffic appliance.

11. The method of claim 9, wherein the data collection device is from a third party separate from the vendor of a network traffic appliance.

12. The method of claim 9, wherein the network traffic data is in a proprietary format.

13. The method of claim 1, wherein the collecting network traffic data at a normal level includes collecting data traffic monitored by a device in the network.

14. The method of claim 1, wherein the determining whether the network data traffic indicates an abnormal condition includes comparing the collected network traffic data to a network traffic baseline.

15. The method of claim 1, wherein the determining whether the network data traffic indicates an abnormal condition includes comparing the collected network traffic data with an expected network traffic pattern.

16. The method of claim 1, wherein the determining whether the network data traffic indicates an abnormal condition includes determining application performance for an application on a device on the network in comparison to an application performance score.

17. The method of claim 1, wherein the increase in collection of network data includes a type of network traffic data selected based on the type of abnormal condition.

18. The method of claim 1, wherein the increase in collection of network data includes filtering for network traffic data contributing to the abnormal condition.

19. The method of claim 1, wherein the increase in collection of network traffic data includes server performance metrics data.

20. A traffic management system for regulating network traffic between computing devices in a network, the system comprising:
   a processor; and
   one or more storage devices, wherein at least one of the storage devices stores network traffic data and at least one of the storage devices is coupled to the processor and comprises modules, which are executable by the processor, comprising:
      a collection module for collecting network traffic data from a first set of data sources;
      a data analysis module coupled to the data collector module, the data analysis module monitoring the network traffic data from the collection module and determining whether the network traffic data indicates an abnormal condition; and
   wherein when an abnormal condition is determined by the data analysis module, the collection module collects network data from a second set of data sources and the collection module increases collection of network traffic data, and the first set of data sources is different than the second set of data sources.

21. The system of claim 20, further comprising:
a network traffic appliance for managing network traffic data on another network; and
wherein the collection module and the data analysis module are in a central management device coupled to the network traffic appliance.

22. The system of claim 20, wherein the collection module monitors the increased collection of network traffic data to determine the cessation of the abnormal condition.

23. The system of claim 22, wherein collection of network traffic data is returned to the normal level when the abnormal condition has ceased.

24. The system of claim 22, further comprising returning the collection of network traffic data to the normal level after a predetermined time.

25. The system of claim 20, wherein the network traffic data from the increased collection is removed from the memory device after the abnormal condition ceases.

26. The system of claim 20, wherein the increased data collection includes network traffic data collected under the Netlow protocol.

27. The system of claim 20, wherein the increased data collection includes at least one of network traffic data from a router, a network device, a firewall or a server.

28. The system of claim 20, wherein the collection module includes a plurality of data interfaces and each of the data interfaces collects a different source of network traffic data.

\* \* \* \* \*